Patented Feb. 14, 1928.

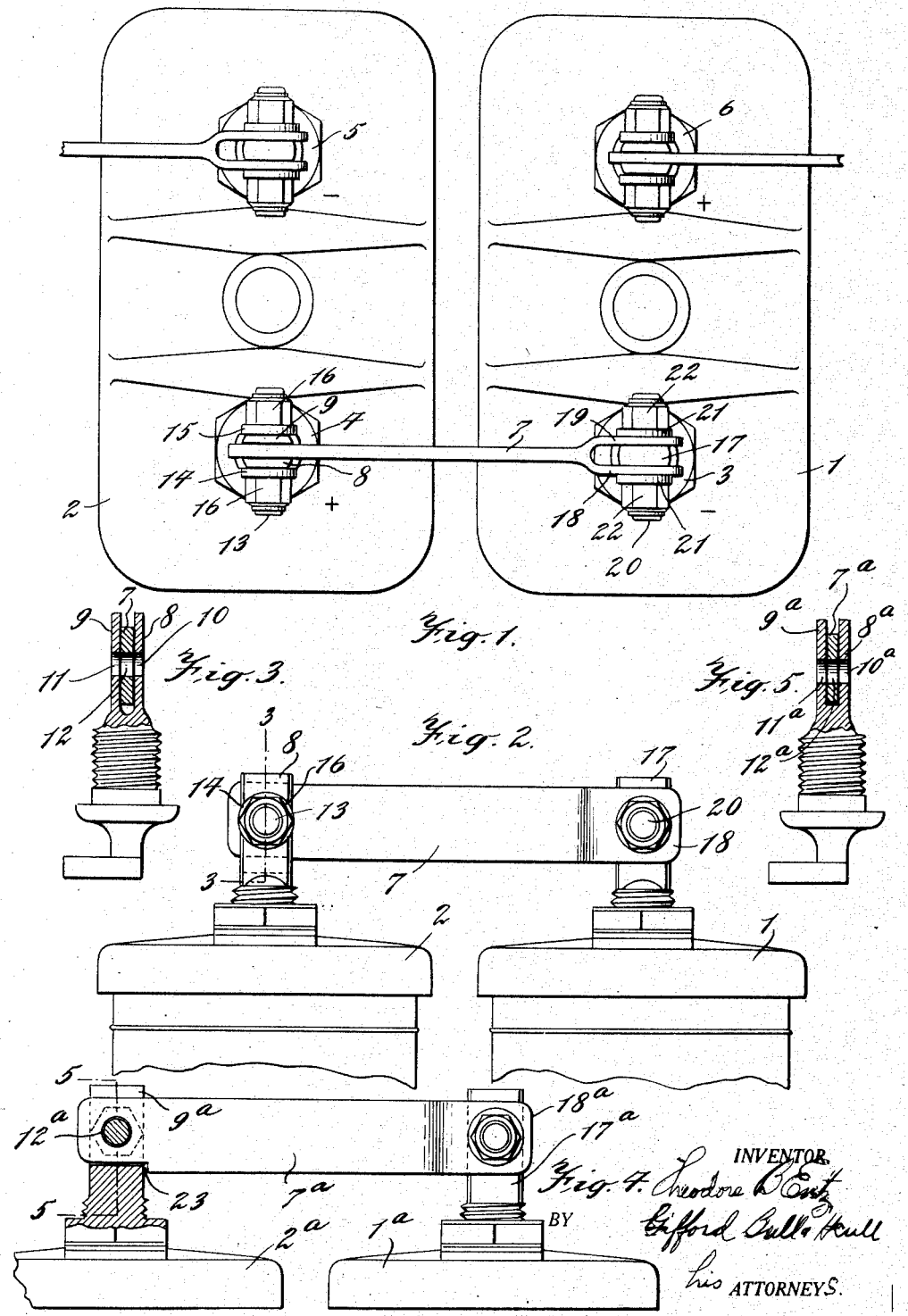

1,659,463

UNITED STATES PATENT OFFICE.

THEODORE B. ENTZ, OF BROOKLYN, NEW YORK, ASSIGNOR, BY MESNE ASSIGNMENTS, TO GOULD STORAGE BATTERY COMPANY, INC., OF NEW YORK, N. Y., A CORPORATION OF NEW YORK.

ELECTRICAL CONNECTER.

Application filed January 24, 1924. Serial No. 688,125.

My invention relates to electrical connecting means and particularly to such means for connecting the terminals of storage batteries. My invention has one of its particular applications in connection with storage batteries for use in so-called farm lighting sets. It often happens that farmers or others who are not familiar with installing and connecting storage battery outfits get the batteries connected up in wrong relation and much damage often comes to the batteries by reason thereof.

I have devised a connecter which makes it impossible to make such errors without mutilation or modification of the connecter for the terminals of the battery.

My invention will be better understood by reading the following description taken in connection with the accompanying drawings wherein Fig. 1 shows a plan view of two battery units with my invention applied thereto; Fig. 2, is a side elevation of the device shown in Fig. 1; Fig. 3 is a section on line 3—3 of Fig. 2 with the connecter bolt omitted; Fig. 4 is a side elevation partly in section of a modification and Fig. 5 is a view on line 5—5 of Fig. 4 with the connecter bolt omitted.

Referring to the drawings, in Fig. 1, there are two battery units, 1 and 2, each provided with a negative and a positive terminal. The negative terminal 3 of unit 1 is connected with the positive terminal 4 of the unit 2. The negative terminal 5 of the unit 2 is identical with the negative terminal 3 of the unit 1, and the positive terminal 6 of the unit 1 is identical with the terminal 4 of the unit 2. In the arrangement shown in Fig. 1, the units 1 or 2 are connected in series. In the ordinary farm lighting installation there are several units and it is essential that the units should be properly connected in order that satisfactory results may be secured. To this end I have devised connecters 7, for connecting the positive and negative terminals of the units together. In the device shown the positive terminals are bifurcated or forked. The prongs 8 and 9 extend upwardly a suitable distance and are provided with registering openings or perforations 10 and 11. One end of the connecter 7, is placed between the prongs 8 and 9 and is also provided with an opening or perforation 12 which registers with the openings 10 and 11, so that when the connecter 7 is placed between the prongs, a connecting bolt 13 may be placed through the openings, washers 14 and 15 placed thereon and nuts 16 tightened thus securely connecting the connecter with the terminal.

The negative terminals consist of a solid member 17 which is likewise provided with an opening. The other end of the connecter 7 is bifurcated and the prongs 18 and 19 straddle the negative terminal 17 as shown in Fig. 1. These prongs are provided with openings which register with the opening in the terminal 17 and a connecting bolt 20 is placed through these registering openings and washers 21 and nuts 22 are placed thereon so as to firmly connect the connecter to the terminal.

It will be noted that the distance between the inside faces of the prongs 18 and 19 is less than the distance between the outside faces of the prongs 8 and 9 of the positive terminals, so that the bifurcated end of the connecter cannot be placed astride the positive terminal. Also the thickness of the prongs 8 and 9 is much less than the distance between the prongs 18 and 19 so that if the bifurcated end of the connecter should be placed so that one of the prongs 18 or 19 should come between the prongs 8 or 9 of the positive terminals, it would be necessary to mutilate or modify the bifurcated end of the connecter in order to get any kind of a secure connection, also the negative terminals are not bifurcated and neither is the other end of the connecter, so that it would be with some difficulty that the farmer might improperly connect the units.

In Figs. 4 and 5, I have shown a modification wherein one end of the connecter 7$^a$ has the opening 12$^a$ therein nearer to the lower edge of the connecter at that end than the opening through the prongs 18$^a$ and 19$^a$ are to the lower edge of the connecter at the other end. Therefore, in addition to the difficulties of erroneous installation already pointed out, it will be noted that if the connecter 7$^a$ should be turned end for end as viewed in Fig. 4, it would be impossible to get the openings in the bifurcated end of the connecter to register with the openings in the bifurcated positive terminal. Therefore, an erroneous connection of the batteries would be thereby prevented.

This difference in distance of the openings from the edges of the connecter at its opposite ends may be secured by removing a portion of the connecter as shown at 23 in Fig. 4 and correspondingly modifying the positive terminal, or it might be done by any other suitable arrangement such as making the end of the connecter the same width as the other part of the connecter and making the opening at a suitable point off center.

From the foregoing, it will be noted that my invention has many advantages resulting from the simplicity of the construction of the connecters themselves and from the provision of improvements whereby the erroneous connection of the battery cells is positively prevented.

Many changes may be made in the details of the construction without departing from the spirit of my invention.

I claim:

1. The combination in a storage battery of a plurality of bifurcated positive terminals, a plurality of negative terminals which are different from the positive terminals, members for connecting a positive and a negative terminal together, said members having one end adapted to fit into the bifurcated positive terminals and the other end bifurcated to receive a negative terminal.

2. A connecter for battery terminals having one plain perforated end and a bifurcated perforated end, said connecter being adapted to be bodily removed and to connect terminals of different polarity only.

3. A connecter for battery terminals of different polarities having one plain perforated end and a bifurcated perforated end, the thickness of the plain end being less than the distance between the inside faces of the prongs on the bifurcated end, said connecter being adapted to be bodily removed and to connect such terminals only in one way.

THEODORE B. ENTZ.